J. P. McLEAN.
MANUFACTURE OF GUN COTTON AND LINT.
No. 47,316. Patented Apr. 18, 1865.
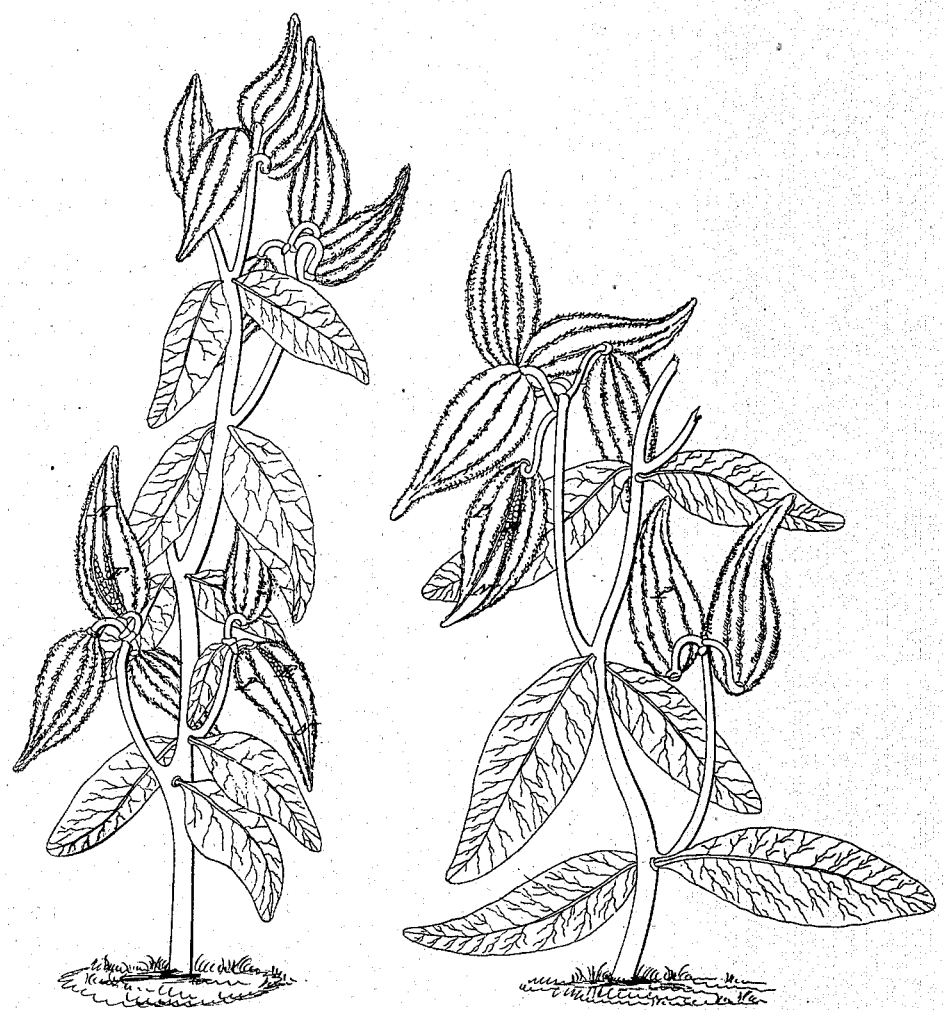
Witnesses
John D. Billings
M. B. Kitcham
Inventor
James P. McLean

UNITED STATES PATENT OFFICE.

JAMES P. McLEAN, OF BROOKLYN, NEW YORK.

IMPROVEMENT IN THE MANUFACTURE OF GUN-COTTON AND LINT.

Specification forming part of Letters Patent No. 47,316, dated April 18, 1865.

*To all whom it may concern:*

Be it known that I, JAMES P. McLEAN, of the city of Brooklyn, in the county of Kings and State of New York, have made a new and useful discovery in the manufacture of a new article of gun-cotton and lint for hospital and other uses; and I hereby declare the following to be a full, clear, and exact description thereof, reference being had to the accompanying drawings, which are lettered to correspond with and form a part of the specification, in order to more clearly illustrate the specific plant from which I obtain the fibers for the above purpose.

In order that the public may fully understand the nature of my discovery or invention, and those skilled in the science of chemistry be enabled to prepare the same, I would state that the *Asclepias syriaca*, commonly called "silk-weed" or "milk-weed," is the plant from which I procure the fibers N N, Figures 1 and 2, for the manufacture of gun-cotton or lint for dressing wounds, sores, and for other uses. The constituent parts of the fiber asclepias are carbon, hydrogen, and oxygen. I believe those to be the very best materials for making gun-cotton, which may be made in the following manner, to wit: Mix in a glass vessel one and a half fluid ounce of nitric acid (specific gravity 1.45) with an equal bulk of sulphuric acid, and when the mixture is quite cold pour it upon one hundred grains of the fiber, which must be well broken up by carding, and placed in a Wedgewood mortar. Imbue the fiber with the acids as soon as possible by means of a glass rod, and when it (the fiber) is thoroughly saturated pour off the superabundant liquid from the fiber, and, by means of the pestle or otherwise, press out all the liquid, if possible; then place the fiber into a glass vessel of pure soft water and thoroughly wash it until the acid taste is entirely removed; then dry it with a gentle heat.

The above is the common mode of making gun-cotton for blasting and other common uses, but for hospital or surgical purposes the following is preferable: You first break up the asclepias fiber N N by means of carding, then steep it in a mixture of niter and sulphuric acid, which effects the necessary change in the fiber, and thus producing a fiber that will readily dissolve in sulphuric ether; hence a better article of collodion or ethereal solution of asclepias gun-fiber, in lieu of gun-cotton, is produced for the use of the surgeon and hospital.

In order to prepare the fiber asclepias or milk-weed for lint, it should be picked from the pods as late in the fall as possible, in order that it may obtain its full growth, and also that a portion of the latent oil may bleach out by exposure to the weather, thereby rendering the fiber more absorbent when applied to fresh cuts. The fibers N N are first taken carefully from the follicle or pod P, Figs. 1 and 2, by the hands, which should be dampened so that all the fibers may be carefully collected and rolled in the hands into a ball similar to a cotton ball, thereby compressing the fibers and liberating all the seed F F, which are entirely removed during the process of rolling.

In case it becomes requisite to make the lint into a woven fabric preparatory to using it for hospital purposes, I would respectfully suggest that the fiber have the seeds carefully rolled out by hand and not by ginning, then oil the fiber with a strong vegetable oil, (I prefer castor oil,) thereby softening the fibers and rendering them more adhesive to each other, so that they may be drawn out with as much ease as upland cotton or short wool. I believe the above is the only successful means by which asclepias fibers N N can be carded and spun into yarn. A small proportion of long fibered-cotton might be used to advantage—say, ten parts of cotton to ninety parts of asclepias fibers. This yarn should be woven into a thick web, (twilled,) so that the lint may be easily raised by means of cards or teasels, and it will be necessary to extract the vegetable or latent oil from the fiber in order to make it more absorbent for fresh wounds before using it. This may be done by boiling it in a solution of carbonate of soda, strong soap, or by steeping it in spirits of ammonia, or by any other well-known chemical process employed for such purposes. After the oil has been removed from the fiber it (the fiber) must be thoroughly washed and dried in the open air, then carded, and packed for use.

When the fiber is used without being woven, it should be thoroughly washed, dried, carded, and packed in boxes in layers. Chlorine or sulphur may be successfully used for bleach ing the fiber, if necessary. The oil must be extracted and the fiber well washed in soapsuds preparatory to bleaching.

The superiority of the asclepias or milkweed fiber as a lint, for the use of the surgeon and hospital, over that which is prepared from old rags, and now in common use, is, first, the plant is a well-known healing medium, as the root has frequently been introduced as a healing agent by surgeons of high standing in cases of scrofula, and on account of its anodyne properties it has been used for asthma. (See United States Dispensatory, page 125.) Poultices have been made from the stalks and leaves for sores, with great success. Therefore I believe the fiber or silky down contained within the follicle or pod to be better adapted for lint than any other material, as it is free from any adulteration of wool, lime, &c., such as may be found in the lint now in use. I have furnished many of the medical gentlemen of the Academy of Medicine in the city of New York with samples of lint prepared by myself from the fiber *Asclepias syriaca*, and they fully concur that it is novel and useful for guncotton, collodion, and lint, as applied for hospital and other purposes. Finally, from the manner in which it receives the most delicate colors, such as employed for coloring silks, I am fully convinced of the great utility of the fiber N N as a lint, as well as for other uses. Therefore,

What I claim as novel and useful, and what I wish to secure by Letters Patent of the United States of America, is—

The introduction and use of the asclepias or milk-weed fibers N N, Figs. 1 and 2, for the manufacture of a new article of gun-cotton—also for lint—either from the fiber itself or from the fabric, or yarn made of the fiber, as above set forth.

In testimony whereof I hereunto subscribe my name in the presence of two witnesses.

JAMES P. McLEAN.

Witnesses:
WILLIAM MACKEY.
ANDREW MACKEY.